United States Patent
Mishra et al.

(10) Patent No.: US 11,783,224 B2
(45) Date of Patent: Oct. 10, 2023

(54) TRAIT-MODELED CHATBOTS

(71) Applicant: International Business Machines Corporation, Armonk, NY (US)

(72) Inventors: Abhijit Mishra, Bangalore (IN); Enara C. Vijil, Westchester, NY (US); Seema Nagar, Bangalore (IN); Kuntal Dey, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 689 days.

(21) Appl. No.: 16/705,849

(22) Filed: Dec. 6, 2019

(65) Prior Publication Data
US 2021/0174241 A1  Jun. 10, 2021

(51) Int. Cl.
*G06N 20/00* (2019.01)
*G06F 16/31* (2019.01)
*H04L 12/58* (2006.01)
*H04L 51/02* (2022.01)

(52) U.S. Cl.
CPC .......... *G06N 20/00* (2019.01); *G06F 16/313* (2019.01); *H04L 51/02* (2013.01)

(58) Field of Classification Search
CPC ........ G06N 20/00; G06F 16/313; H04L 51/02
See application file for complete search history.

(56) References Cited

U.S. PATENT DOCUMENTS

| | | | |
|---|---|---|---|
| 6,732,090 B2 | 5/2004 | Shanahan et al. | |
| 7,505,892 B2 | 3/2009 | Foderaro | |
| 7,933,774 B1 * | 4/2011 | Begeja | G10L 15/063 704/231 |
| 8,539,359 B2 * | 9/2013 | Rapaport | G06Q 30/02 715/767 |
| 9,871,922 B1 * | 1/2018 | Klein | H04L 12/1831 |
| 11,188,809 B2 * | 11/2021 | Herzig | G06N 5/003 |
| 2003/0028498 A1 * | 2/2003 | Hayes-Roth | G06N 3/006 706/17 |
| 2010/0205541 A1 * | 8/2010 | Rapaport | G06Q 10/10 715/753 |

(Continued)

FOREIGN PATENT DOCUMENTS

| | | |
|---|---|---|
| KR | 10-2018-0019869 A | 2/2018 |
| WO | 200067232 A1 | 11/2000 |
| WO | 2017189559 A1 | 11/2017 |

OTHER PUBLICATIONS

Chaves, A.P., et al., "Single or Multiple Conversational Agents?: An Interactional Coherence Comparison," Proceedings of the 2018 CHI Conference on Human Factors in Computing Systems (CHI '18), Apr. 21, 2018, 13 pages, Paper 191, ACM, New York, NY, USA.

(Continued)

*Primary Examiner* — Justin S Lee
*Assistant Examiner* — Carl E Barnes, Jr.
(74) *Attorney, Agent, or Firm* — SHERMAN IP LLP; Kenneth L. Sherman; Hemavathy Perumal

(57) ABSTRACT

One embodiment of the invention provides a method of training a chatbot. The method comprises identifying one or more chat logs that exhibit a trait. The method further comprises identifying one or more labels associated with the trait based on the one or more chat logs. The method further comprises training the chatbot to generate a response that models the trait based on the one or more chat logs. The method further comprises labeling the chatbot with the one or more labels.

20 Claims, 8 Drawing Sheets

(56) References Cited

U.S. PATENT DOCUMENTS

| | | | | |
|---|---|---|---|---|
| 2015/0032443 A1* | 1/2015 | Karov | ...................... | G06F 40/30 |
| | | | | 704/9 |
| 2015/0185996 A1* | 7/2015 | Brown | ................ | G06F 3/04817 |
| | | | | 715/706 |
| 2016/0110422 A1* | 4/2016 | Roytman | ................. | G06N 5/00 |
| | | | | 706/12 |
| 2016/0179787 A1* | 6/2016 | Deleeuw | ................. | G10L 15/22 |
| | | | | 704/9 |
| 2017/0017635 A1* | 1/2017 | Leliwa | .................. | G06F 40/258 |
| 2018/0053119 A1* | 2/2018 | Zeng | ..................... | G06F 40/205 |
| 2018/0054464 A1* | 2/2018 | Zhang | .................... | H04L 51/02 |
| 2018/0196796 A1* | 7/2018 | Wu | ......................... | G06N 5/022 |
| 2018/0374000 A1* | 12/2018 | Herzig | ................... | G06N 3/006 |
| 2019/0199658 A1* | 6/2019 | Kim | ...................... | H04L 51/214 |

OTHER PUBLICATIONS

Subramaniam, S. et al., "COBOTS—A Cognitive Multi-Bot Conversational Framework for Technical Support," Proceedings of the 17th International Conference on Autonomous Agents and Multiagent Systems (AAMAS '18), Jul. 10, 2015, pp. 597-604, Richland, SC.

Mell et al., "The NIST Definition of Cloud Computing," National Institute of Standards and Technology Special Publication 800-145, Sep. 2011, 7 pages, United States.

Pinhanez, C.S et al., "Different but Equal: Comparing User Collaboration with Digital Personal Assistants vs. Teams of Expert Agents," Aug. 28, 2018, pp. 1-21, downloaded: https://arxiv.org/abs/1808.08157, United States.

\* cited by examiner

TRAIT-MODELED CHATBOTS

BACKGROUND

The field of embodiments of the invention generally relate to chatbots.

A chatbot is software configured to conduct a conversation via auditory and/or textual methods (i.e., an automated conversational agent).

Conventional chatbots include an all-in-one chatbot (i.e., a single universal chatbot) that provides all advice from all perspectives. Such an all-in-one chatbot can be characterized as a "Jack of all trades, master of none" as this chatbot is not optimized for any particular trait (e.g., not optimized for a personality trait, an expertise trait, or any other trait that a subject matter expert or a domain expert has or exhibits). Further, a user will experience interacting with a conventional chatbot as an interaction with a hyper-specialized agent with one type of personality only.

For different topics of interest, individuals like to seek advice from others with different traits. For example, an individual desiring to make an investment (e.g., in mutual funds) may want to seek advice from other individuals with different perspectives, such as friends who invest regularly, family members whose opinions matter to the individual, financial experts who the individual trusts, lifestyle experts who can opine on how much the investment may negatively affect the individual's lifestyle today and the potential benefits the individual may reap from the investment in the future, etc. However, it may be impractical and costly (in terms of time and effort) for the individual to reach out to and schedule appointments/consultations with so many different individuals. Further, a conventional all-in-one chatbot is unable to provide advice from different perspectives (i.e., unable to model the other individuals with different perspectives).

SUMMARY

Embodiments of the invention generally relate to chatbots, and more specifically, to trait-modeled chatbots.

One embodiment of the invention provides a method of training a chatbot. The method comprises identifying one or more chat logs that exhibit a trait. The method further comprises identifying one or more labels associated with the trait based on the one or more chat logs. The method further comprises training the chatbot to generate a response that models the trait based on the one or more chat logs. The method further comprises labeling the chatbot with the one or more labels. The chatbot is invoked to join a virtual chatroom in response to a chat session involving a user in the virtual chatroom who requires one or more responses that models the trait. Each label comprises a keyword or a concept associated with the trait. The trait comprises a personality trait or an expertise trait that a subject matter expert/domain expert has. Other embodiments include a system of training a chatbot. These features contribute to the advantage of training a chatbot to specialize in generating responses, in a particular area/domain/topic, that exhibit/model/show a single trait that a subject matter expert/domain expert of the particular area/domain/topic has or exhibits.

One or more of the following features may be included. In some embodiments, the chatbot is trained to generate a response that jointly models a set of traits based on a set of chat logs. These optional features contribute to the advantage of training a chatbot to specialize in generating responses, in a particular area/domain/topic, that jointly exhibit/model/show a mix of traits that a subject matter expert/domain expert of the particular area/domain/topic has or exhibits.

Another embodiment of the invention provides a method of controlling invocation of at least one of a plurality of available chatbots in a virtual chatroom. The method comprises initiating a chat session with a user in the virtual chatroom. The method further comprises determining an intent of the user based on a chat log of the chat session. The method further comprises extracting a set of traits from the chat session based on the intent of the user, where the set of traits extracted is indicative of at least one trait requirement that a response to the user must satisfy. The method further comprises selecting a chatbot from the plurality of available chatbots based on the set of traits extracted, where the chatbot selected is configured to generate a response that satisfies the at least one trait requirement. The method further comprises invoking the chatbot selected in the virtual chatroom to interact with the user. The chatbot selected is either a first chatbot configured to generate a response that models the set of traits extracted or a second chatbot configured to generate a response that models a set of different traits similar to the set of traits extracted. Each trait comprises a personality trait or an expertise trait that a subject matter expert/domain expert has. The set of traits extracted comprises one of a single trait or multiple traits. These features contribute to the advantage of selectively invoking, based on the intent of the user, a chatbot from the plurality of available chatbots in the chatroom to interact with the user, thereby allowing the user to interact with an agent with one or more traits that the invoked chatbot models. Other advantages include providing a multi-agent chatroom that allows the user to experience interacting with multiple, different chat agents modeling different traits (i.e., providing advice from different perspectives) via the available chatbots.

One or more of the following features may be included. In some embodiments, a change in the intent of the user is detected based on the chat log. In some embodiments, an additional set of traits is extracted from the chat session based on the change, where the additional set of traits extracted is indicative of at least one different trait requirement that a different response to the user must satisfy. In some embodiments, a different chatbot from the plurality of available chatbots is selected based on the additional set of traits extracted, where the different chatbot selected is configured to generate a response that satisfies the at least one different trait requirement. In some embodiments, the different chatbot selected is invoked in the virtual chatroom to interact with the user. These optional features contribute to the advantage of selectively invoking, based on the change in the intent of the user, a different chatbot from the plurality of available chatbots in the chatroom to interact with the user, thereby allowing the user to interact with a different agent with one or more traits that the invoked different chatbot models.

These and other aspects, features and advantages of embodiments of the invention will be understood with reference to the drawing figures, and detailed description herein, and will be realized by means of the various elements and combinations particularly pointed out in the appended claims. It is to be understood that both the foregoing general description and the following brief description of the drawings and detailed description of embodiments of the invention are exemplary and explanatory of preferred embodiments of the invention, and are not restrictive of embodiments of the invention, as claimed.

BRIEF DESCRIPTION OF THE DRAWINGS

The subject matter which is regarded as embodiments of the invention are particularly pointed out and distinctly claimed in the claims at the conclusion of the specification. The foregoing and other features and advantages of embodiments of the invention are apparent from the following detailed description taken in conjunction with the accompanying drawings in which:

Figure 1:
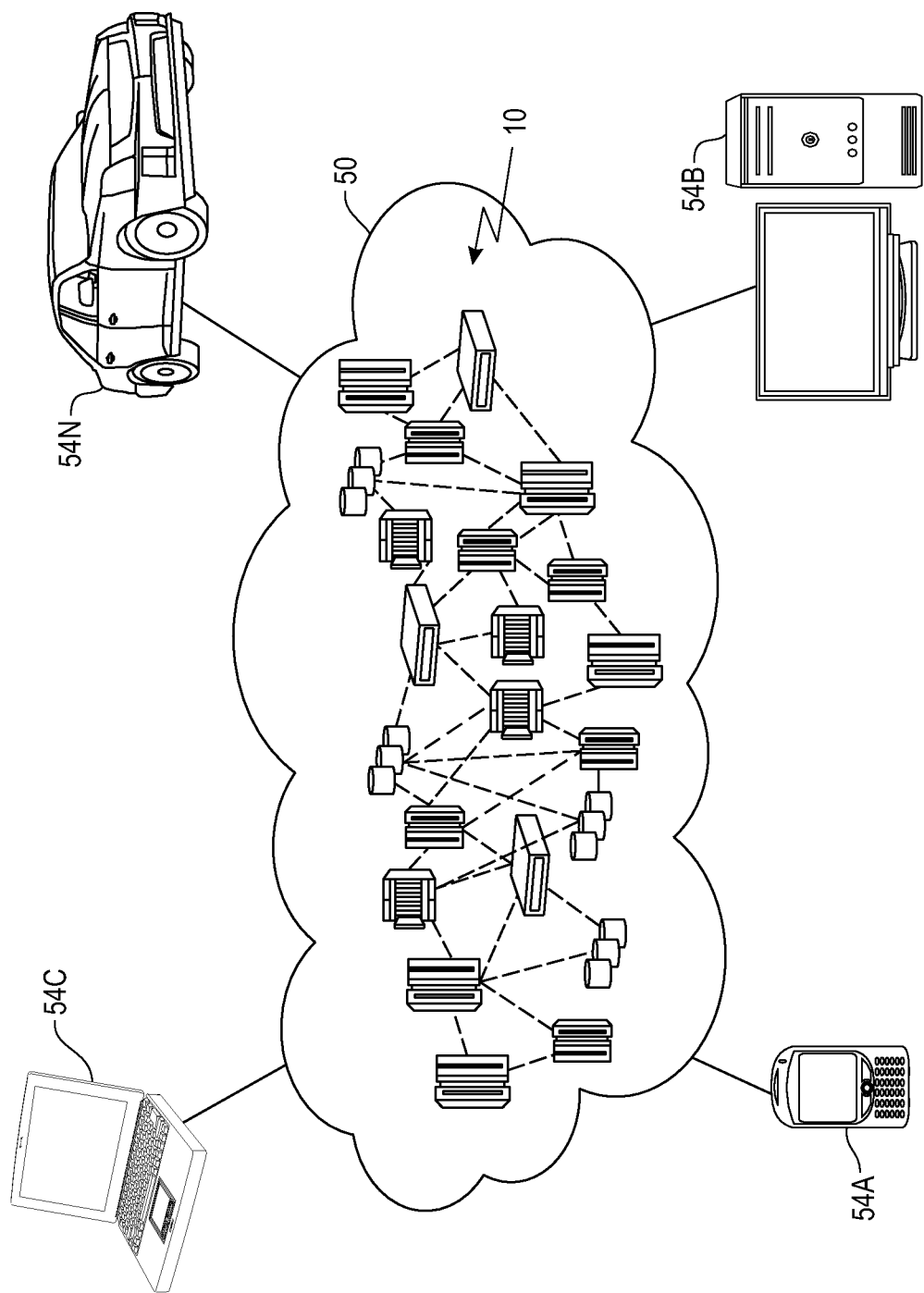
FIG. 1 depicts a cloud computing environment according to an embodiment of the present invention.

The detailed description explains the preferred embodiments of the invention, together with advantages and features, by way of example with reference to the drawings.

DETAILED DESCRIPTION

Embodiments of the invention generally relate to chatbots, and more specifically, to trait-modeled chatbots. One embodiment of the invention provides a method of training a chatbot. The method comprises identifying one or more chat logs that exhibit a trait. The method further comprises identifying one or more labels associated with the trait based on the one or more chat logs. The method further comprises training the chatbot to generate a response that models the trait based on the one or more chat logs. The method further comprises labeling the chatbot with the one or more labels. The chatbot is invoked to join a virtual chatroom in response to a chat session involving a user in the virtual chatroom who requires one or more responses that models the trait. Each label comprises a keyword or a concept associated with the trait. The trait comprises a personality trait or an expertise trait that a subject matter expert/domain expert has. The method trains the chatbot to specialize in generating responses, in a particular area/domain/topic, that exhibit/model/show a single trait or a mix of traits that a subject matter expert/domain expert of the particular area/domain/topic has or exhibits.

Another embodiment of the invention provides a system of training a chatbot. The system comprises at least one processor. The system further comprises a non-transitory processor-readable memory device storing instructions that when executed by the at least one processor causes the at least one processor to perform operations. The operations include identifying one or more chat logs that exhibit a trait. The operations further include identifying one or more labels associated with the trait based on the one or more chat logs. The operations further include training the chatbot to generate a response that models the trait based on the one or more chat logs. The operations further include labeling the chatbot with the one or more labels. Each label comprises a keyword or a concept associated with the trait. The trait comprises a personality trait or an expertise trait that a subject matter expert/domain expert has. The system trains the chatbot to specialize in generating responses, in a particular area/domain/topic, that exhibit/model/show a single trait or a mix of traits that a subject matter expert/ domain expert of the particular area/domain/topic has or exhibits.

Another embodiment of the invention provides a method of controlling invocation of at least one of a plurality of available chatbots in a virtual chatroom. The method comprises initiating a chat session with a user in the virtual chatroom. The method further comprises determining an intent of the user based on a chat log of the chat session. The method further comprises extracting a set of traits from the chat session based on the intent of the user, where the set of traits extracted is indicative of at least one trait requirement that a response to the user must satisfy. The method further comprises selecting a chatbot from the plurality of available chatbots based on the set of traits extracted, where the chatbot selected is configured to generate a response that satisfies the at least one trait requirement. The method further comprises invoking the chatbot selected in the virtual chatroom to interact with the user. The chatbot selected is either a first chatbot configured to generate a response that models the set of traits extracted or a second chatbot configured to generate a response that models a set of different traits similar to the set of traits extracted. Each trait comprises a personality trait or an expertise trait that a subject matter expert/domain expert has. The set of traits extracted comprises one of a single trait or multiple traits. The method provides a multi-agent chatroom that allows the user to experience interacting with multiple, different chat agents modeling different traits (i.e., providing advice from different perspectives) via the available chatbots.

For expository purposes, the terms "chatbot" and "chat agent" are used interchangeably in this specification.

For expository purposes, the term "trait" as used herein in generally refers to a distinctive or distinguishing aspect, attribute, characteristic, feature, or property that a subject matter expert (SME), a domain expert, or any other person has or exhibits. There are different types of traits such as, but not limited to, personality traits (i.e., traits indicative of different types of personalities that different SMEs/domain experts have or exhibit, such as mild, pushy, story-telling, patient, fast talking, etc.), expertise traits (i.e., traits indicative of different types of expertise, such as different areas, domains, or topics that different SMEs/domain experts are authorities of or are specialized in, such as an aggressive stock trader, a defensive stock trader, a balanced/mixed-mode stock trader, etc.), etc.

For expository purposes, the term "specialized chatbot" as used herein generally refers to a chatbot specialized in generating/providing responses, in a particular area/domain/ topic, that exhibit/model/show one or more particular traits (e.g., a single trait or a mix of traits that a SME/domain expert of the particular area/domain/topic has or exhibits). Each specialized chatbot is designed to model (e.g., mimic or imitate) a SME/domain expert with one or more particular traits. The terms "specialized chatbot" and "trait-modeled chatbot" are used interchangeably in this specification.

For expository purposes, the term "multi-entity chatroom" generally refers to a virtual chatroom (or chat room) in which multiple participants can interact with one another. Examples of participants include, but are not limited to, a user (i.e., a human participant, such as a customer or client user), a chatbot, a live agent (e.g., a human participant, such as a customer service or client service representative), etc. The terms "multi-entity chatroom", "multi-agent chatroom", and "multi-person chatroom" are used interchangeably in the specification.

Embodiments of the invention provide a method and system for training a specialized chatbot to model one or more traits based on training data. Embodiments of the invention further provide a method and system for deploying (i.e., operating) a multi-agent chatroom and controlling invocation of at least one of a plurality of available specialized chatbots in the chatroom. The chatroom allows a user to experience interacting with multiple, different chat agents modeling different traits (i.e., providing advice from different perspectives) via the specialized chatbots. Specifically, the chatroom is controlled by a main chatbot configured to: (1) interact with a user who joins the chatroom, and (2) selectively invoke at least one of the specialized chatbots in the chatroom to interact with the user based on an interaction with the user in the chat room (e.g., an interaction between the user and the main chatbot or a previously invoked specialized chatbot in the chatroom). Therefore, at any given point in time that the user is in the chatroom, the chatroom has multiple participants including the user (i.e., a human participant), the main chatbot (i.e., a machine participant), and, if invoked by the main chatbot, at least one specialized chatbot (i.e., at least one other machine participant). The specialized chatbots represent multiple, different chat agents available to join the chatroom to provide the user with wider and deeper information covering more perspectives than what a conventional chatbot covers.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. In one embodiment, this cloud model includes at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants).

Resource pooling: the provider's computing resources are pooled to serve multiple consumers using a multi-tenant model, with different physical and virtual resources dynamically assigned and reassigned according to demand. In one embodiment, there is a sense of location independence in that the consumer generally has no control or knowledge over the exact location of the provided resources but is able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. In one embodiment, it is managed by the organization or a third party and exists on-premises or off-premises.

Community cloud: the cloud infrastructure is shared by several organizations and supports a specific community that has shared concerns (e.g., mission, security requirements, policy, and compliance considerations). In one embodiment, it is managed by the organizations or a third party and exists on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50 according to an embodiment of the present invention. As shown, in one embodiment, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N communicate. In one embodiment, nodes 10 communicate with one another. In one embodiment, they are grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
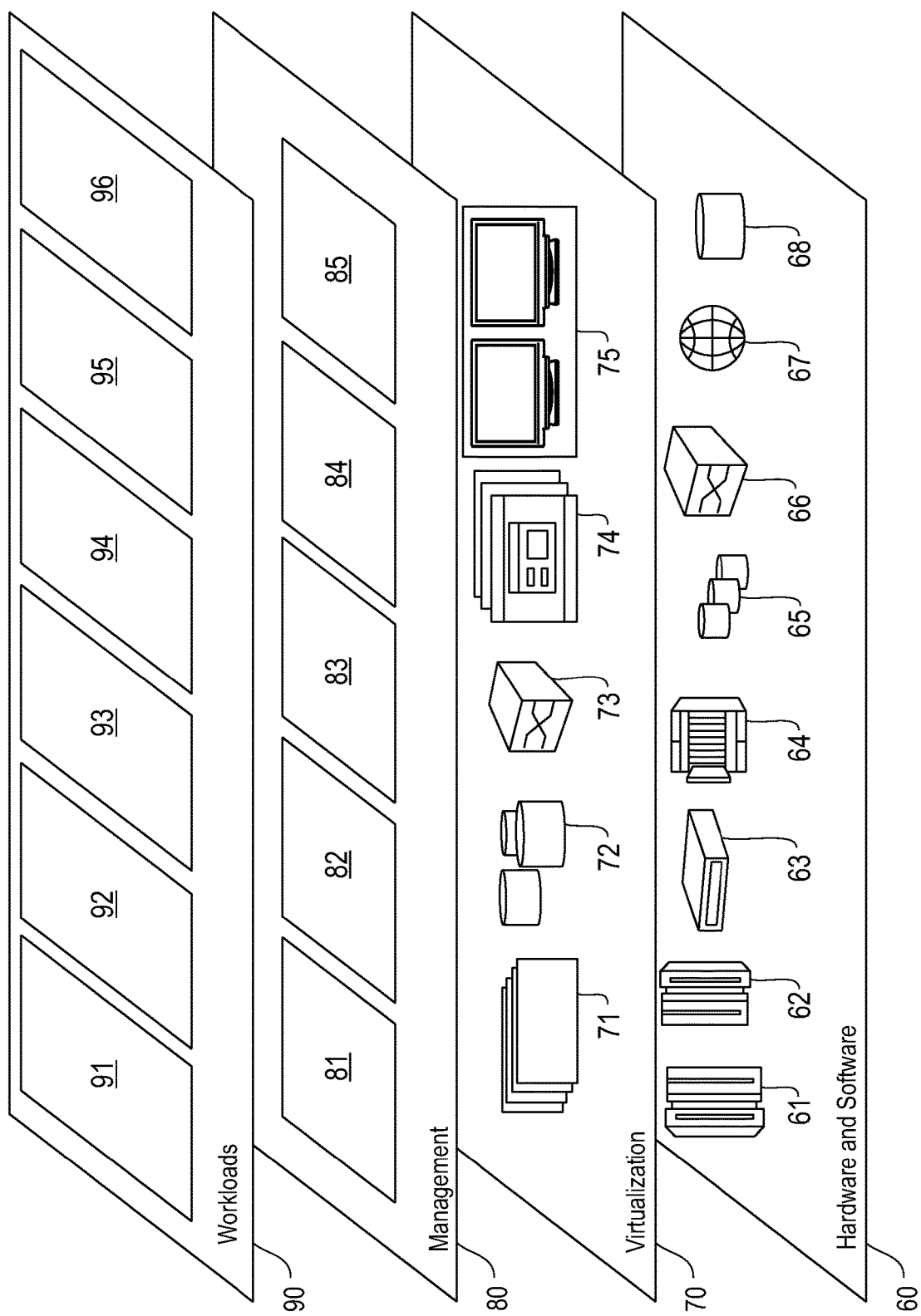
FIG. 2 depicts abstraction model layers according to an embodiment of the present invention.

FIG. 2 depicts a set of functional abstraction layers provided by cloud computing environment 50 according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

In one embodiment, virtualization layer 70 provides an abstraction layer from which the following examples of virtual entities are provided: virtual servers 71; virtual storage 72; virtual networks 73, including virtual private networks; virtual applications and operating systems 74; and virtual clients 75.

In one embodiment, management layer 80 provides the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one embodiment, these resources include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

In one embodiment, workloads layer 90 provides examples of functionality for which the cloud computing environment is utilized. In one embodiment, examples of workloads and functions which are provided from this layer include: mapping and navigation 91; software development and lifecycle management 92; virtual classroom education delivery 93; data analytics processing 94; transaction processing 95; and a multi-agent chatroom system 96 that trains and/or invokes multiple, different trait-modeled chatbots (e.g., a training system 330 that trains the chatbots and/or a deployment system 430 that controls invocation of the chatbots in a multi-agent chatroom, as described in detail later herein).

Figure 3:
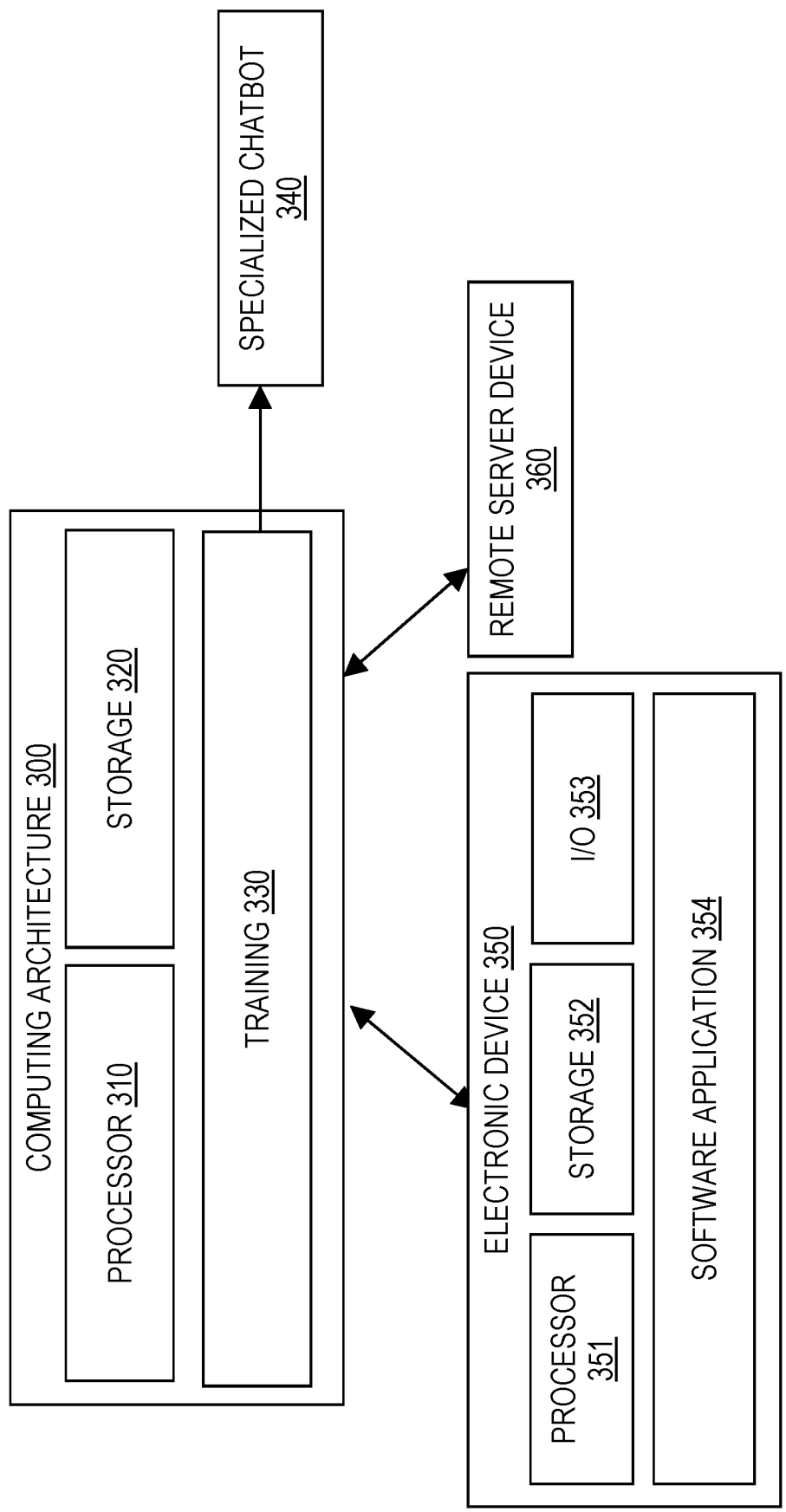
FIG. 3 illustrates an example computing architecture for training a specialized chatbot, in accordance with an embodiment of the invention.

FIG. 3 illustrates an example computing architecture 300 for training a specialized chatbot 340, in accordance with an embodiment of the invention. In one embodiment, the computing architecture 300 is a centralized computing architecture. In another embodiment, the computing architecture 300 is a distributed computing architecture.

In one embodiment, the computing architecture 300 comprises computation resources such as, but not limited to, one or more processor units 310 and one or more storage units 320. One or more applications may execute/operate on the computing architecture 300 utilizing the computation resources of the computing architecture 300. In one embodiment, the applications on the computing architecture 300 include, but are not limited to, a training system 330 configured to train a specialized chatbot 340 to model one or more traits based on training data. A specialized chatbot 340 comprises a machine learning model trained to generate a conversation including one or more responses (i.e., chatbot responses) that exhibit/show one or more traits (e.g., a single trait, or a mix of traits). As described in detail later herein, in one embodiment, a specialized chatbot 340 is invoked in a virtual multi-agent chatroom to interact with a user in the chatroom who has expressed an intent to interact with an agent with a trait that the specialized chatbot 340 models.

In one embodiment, the training system 330 is configured to exchange data with one or more electronic devices 350 and/or one or more remote server devices 360 over a connection (e.g., a wireless connection such as a Wi-Fi connection or a cellular data connection, a wired connection, or a combination of the two).

In one embodiment, an electronic device 350 comprises one or more computation resources such as, but not limited to, one or more processor units 351 and one or more storage units 352. One or more applications may execute/operate on an electronic device 350 utilizing the one or more computation resources of the electronic device 350 such as, but not limited to, one or more software applications 354 loaded onto or downloaded to the electronic device 350. Examples of software applications 354 include, but are not limited to, artificial intelligence (AI) applications, natural language processing (NLP) applications, chat applications, messaging applications, etc. For example, in one embodiment, a specialized chatbot 340 trained by the training system 300 is invoked within a chat application on an electronic device 350.

Examples of an electronic device 350 include, but are not limited to, a desktop computer, a mobile electronic device (e.g., a tablet, a smart phone, a laptop, etc.), a wearable device (e.g., a smart watch, etc.), an Internet of Things (IoT) device, a smart appliance such as a smart television, etc.

In one embodiment, an electronic device 350 comprises one or more input/output (I/O) units 353 integrated in or coupled to the electronic device 350, such as a keyboard, a keypad, a touch interface, a display screen, etc. A user may utilize an I/O module 353 of an electronic device 350 to configure one or more user preferences, configure one or more parameters (e.g., thresholds, etc.), provide user input (e.g., explicitly provide/select one or more traits that the training system 300 should train one or more specialized chatbots 340 to model), etc.

In one embodiment, an electronic device 350 and/or a remote server device 360 may be a source of training data.

In one embodiment, the training system 330 may be accessed or utilized by one or more online services (e.g., AI services, NLP services, chat services, messaging services, etc.) hosted on a remote server device 360 and/or one or more software applications 354 (e.g., AI applications, NLP applications, chat applications, messaging applications) operating on an electronic device 350. For example, in one embodiment, a virtual assistant, a search engine, or another type of software application 354 operating on an electronic device 350 invokes a specialized chatbot 340 trained by the training system 300 to interact with a user who has expressed an intent to interact with an agent with a trait that the specialized chatbot 340 models.

These features contribute to the advantage of training a specialized chatbot 340 to specialize in generating responses, in a particular area/domain/topic, that exhibit/model/show a single trait or a mix of traits that a subject matter expert/domain expert of the particular area/domain/topic has or exhibits.

Figure 4:
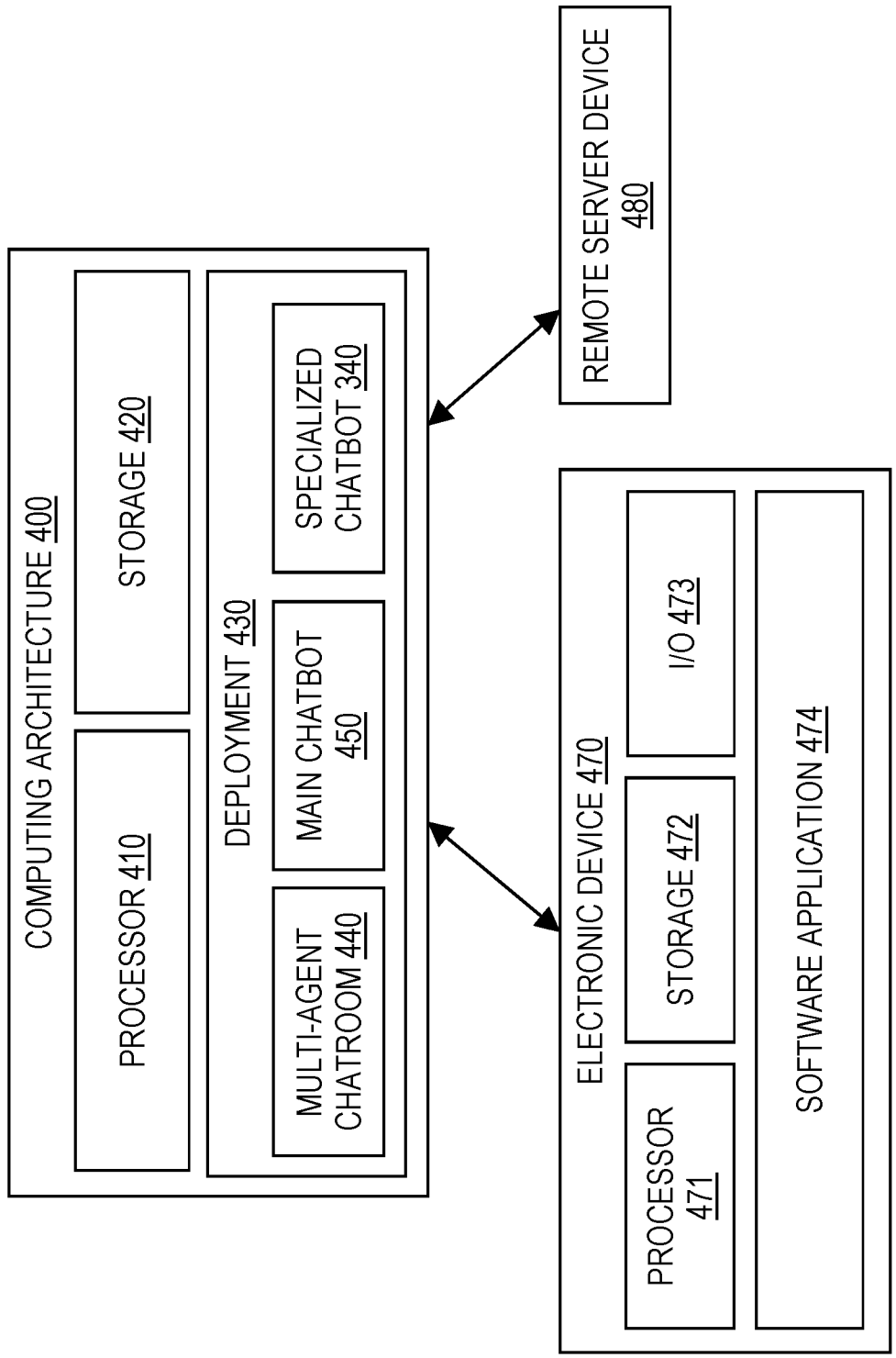
FIG. 4 illustrates an example computing architecture for deploying a multi-agent chatroom and controlling invocation of a specialized chatbot in the chatroom, in accordance with an embodiment of the invention.

FIG. 4 illustrates an example computing architecture 400 for deploying a multi-agent chatroom 440 and controlling invocation of at least one of a plurality of available specialized chatbots 340 in the chatroom 440, in accordance with an embodiment of the invention. In one embodiment, the computing architecture 400 is a centralized computing architecture. In another embodiment, the computing architecture 400 is a distributed computing architecture.

In one embodiment, the computing architecture 400 comprises computation resources such as, but not limited to, one or more processor units 410 and one or more storage units 420. One or more applications may execute/operate on the computing architecture 400 utilizing the computation resources of the computing architecture 400. In one embodiment, the applications on the computing architecture 400 include, but are not limited to, a deployment system 430 configured to execute/operate a multi-agent chatroom 440 that allows multiple participants to interact with one another, and selectively invoke at least one of a plurality of available specialized chatbots 340 in the chatroom 440 via a main chatbot 450. The specialized chatbots 340 represent multiple, different chat agents. In one embodiment, each specialized chatbot 340 utilized by the deployment system 430 is either trained online or offline (e.g., by the training system 330).

In one embodiment, the deployment system 430 maintains a plurality of different specialized chatbots 340. For example, in one embodiment, the deployment system 430 includes specialized chatbots 340 modeling traits associated with domains of equity based stock markets, foreign exchange markets, derivatives markets, and debt funds. For example, for the domain of equity based stock markets, the deployment system 430 includes, but is not limited to, a specialized chatbot 340 modeling traits that an aggressive stock trader has (e.g., short term investing), a specialized chatbot 340 modeling traits that a defensive stock trader has (e.g., long term investing), a specialized chatbot 340 modeling traits that a balanced/mixed-mode stock trader (e.g., a mixture of traits that an aggressive stock trader has and traits that a defensive stock trader has), etc.

As described in detail later herein, the main chatbot 450 is configured to initiate a chat session with a user in response to the user joining the chatroom 440, monitor the chat session to detect an intent of the user, and, based on the intent of the user, selectively invoke a specialized chatbot 340 in the chatroom 440 to interact with the user. For example, in one embodiment, the main chatbot 450 invokes a specialized chatbot 340 to join the chatroom 440 to interact with a user in the chatroom 440 in response to the user expressing an intent to interact with an agent with a trait that the specialized chatbot 340 models.

In one embodiment, the deployment system 430 is configured to exchange data with one or more electronic devices 470 and/or one or more remote server devices 480 over a connection (e.g., a wireless connection such as a Wi-Fi connection or a cellular data connection, a wired connection, or a combination of the two).

In one embodiment, an electronic device 470 comprises one or more computation resources such as, but not limited to, one or more processor units 471 and one or more storage units 472. One or more applications may execute/operate on an electronic device 470 utilizing the one or more computation resources of the electronic device 470 such as, but not limited to, one or more software applications 474 loaded onto or downloaded to the electronic device 470. Examples of software applications 474 include, but are not limited to, AI applications, NLP applications, chat applications, messaging applications, etc.

Examples of an electronic device 470 include, but are not limited to, a desktop computer, a mobile electronic device (e.g., a tablet, a smart phone, a laptop, etc.), a wearable device (e.g., a smart watch, etc.), an IoT device, a smart appliance such as a smart television, etc.

In one embodiment, an electronic device 470 comprises one or more I/O units 473 integrated in or coupled to the electronic device 470, such as a keyboard, a keypad, a touch interface, a display screen, etc. A user may utilize an I/O module 473 of an electronic device 470 to configure one or more user preferences, configure one or more parameters (e.g., thresholds, etc.), provide user input (e.g., explicitly provide/select one or more traits that an agent the user wants to interact with must have), etc.

In one embodiment, an electronic device 470 and/or a remote server device 480 may be a source of one or more policies relating to one or more traits.

In one embodiment, the deployment system 430 may be accessed or utilized by one or more online services (e.g., AI services, NLP services, chat services, messaging services, etc.) hosted on a remote server device 480 and/or one or more software applications 474 (e.g., AI applications, NLP applications, chat applications, messaging applications) operating on an electronic device 470. For example, in one embodiment, a virtual assistant, a search engine, or another type of software application 474 operating on an electronic device 470 utilizes the deployment system 430 to provide a multi-agent chatroom that allows a user to experience interacting with different specialized chatbots 340 modeling different traits.

These features contribute to the advantage of selectively invoking, based on an intent of a user in a virtual chatroom 440, a specialized chatbot 340 from a plurality of available specialized chatbots 340 in the chatroom 440 to interact with the user, thereby allowing the user to interact with an agent with one or more traits that the invoked specialized chatbot 340 models. Other advantages include providing a multi-agent virtual chatroom 440 that allows a user in the chatroom 440 to experience interacting with multiple, different chat agents modeling different traits (i.e., providing advice from different perspectives) via a plurality of available specialized chatbots 340.

Figure 5:
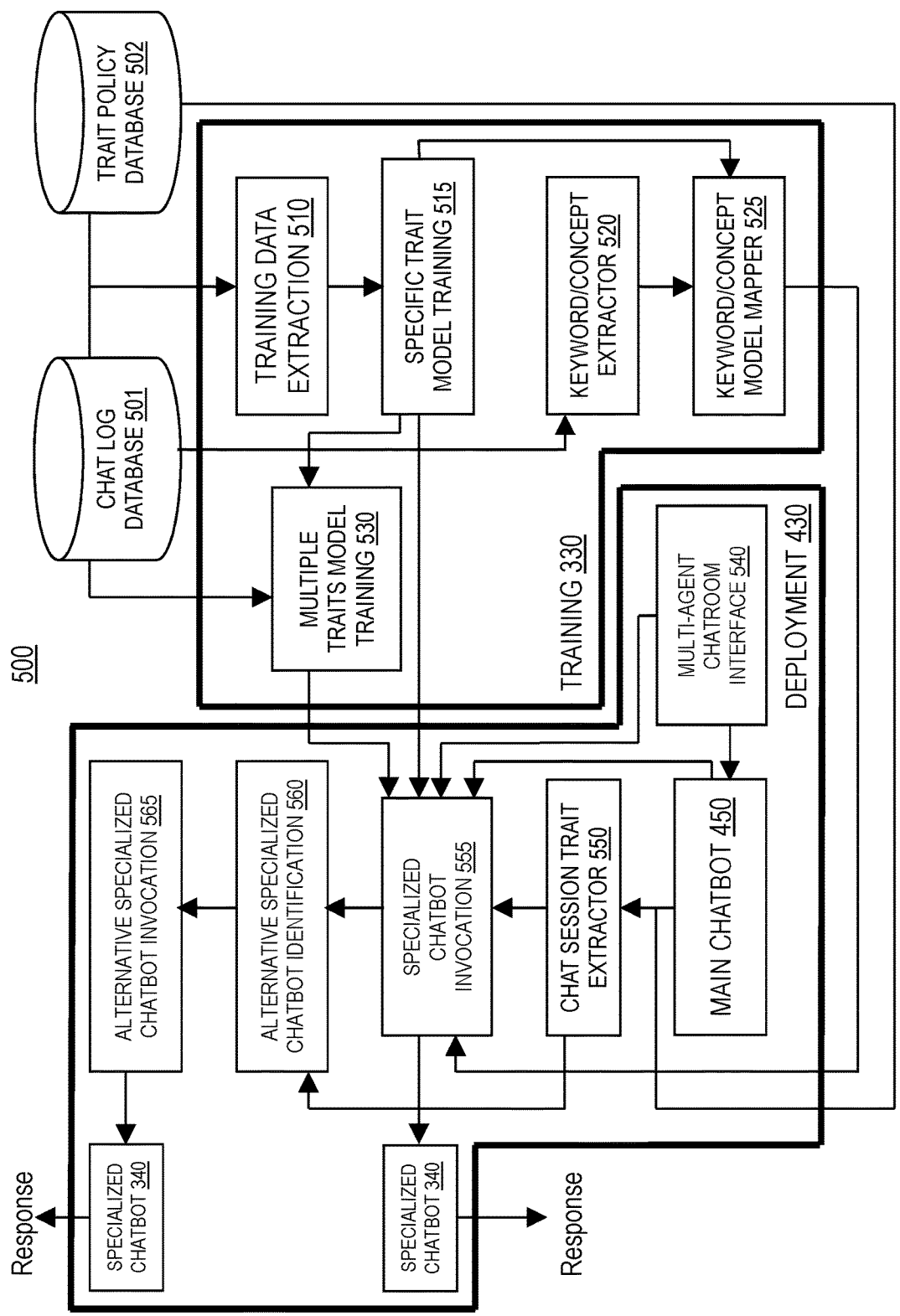
FIG. 5 illustrates an example process involving a training system and a deployment system, in accordance with an embodiment of the invention.

FIG. 5 illustrates an example process 500 involving the training system 330 and the deployment system 430, in accordance with an embodiment of the invention. In one embodiment, the process 500 comprises two separate phases: (1) a training phase during which one or more specialized chatbots are trained via the training system 330, and (2) a deployment (i.e., operations) phase during which a multi-agent chatroom 440 is deployed and at least one of a plurality of available specialized chatbots 340 are invoked in the chatroom 440, all via the deployment system 430. The plurality of available specialized chatbots 340 are received from the training system 330 and/or maintained in the deployment system 430.

In one embodiment, the training system 330 comprises a training data extraction unit 510. In the training phase, the training data extraction unit 510 is configured to receive, as input, at least one of the following: (1) a database 501 of chat logs ("chat log database"), and (2) a database 502 of policies relating to traits ("trait policy database").

In one embodiment, the chat log database 501 is obtained from an electronic device 350 or a remote server device 360. The chat log database 501 comprises chat logs for a large volume of chat sessions, wherein each chat session is a conversation between two or more participants (e.g., human participants, machine participants such as chatbots, etc.).

For expository purposes, let the term "text unit" generally denote a block of text included in a chat log. Examples of text units include, but are not limited to, a chat message, a sentence, a paragraph, etc.

In one embodiment, the trait policy database 502 is obtained from an electronic device 350 or a remote server device 360. In one embodiment, the trait policy database 502 comprises one or more policies relating to one or more traits. For example, in one embodiment, the one or more policies define at least one of the following: (1) a set of traits, and (2) a set of subdomains, wherein each subdomain is defined by at least one trait. In the training phase, for each trait and/or each subdomain, the training data extraction unit 510 is configured to extract training data relevant to the trait and/or the subdomain from the chat log database 501.

Specifically, for each trait and/or each subdomain, the training data extraction unit 510 is configured to: (1) parse each chat log of the chat log database 501 into one or more text units, (2) determine a degree of match (i.e., similarity) between each text unit of each chat log of the chat log database 501 and the trait and/or the subdomain based on keywords included in the chat logs of the chat log database 501, (3) generate a mapping ("text unit mapping") between each text unit of each chat log of the chat log database 501 and the trait and/or the subdomain, wherein the text unit mapping has a weight that is based on a degree of match between the text unit and the trait and/or the subdomain, and (4) identify (or filter), from the chat log database 501, one or more chat logs that exhibit/show the trait and/or the subdomain based on at least one text unit mapping between at least one text unit and the trait and/or the subdomain, wherein the one or more chat logs identified (or filtered) are provided as training data relevant to the trait and/or the subdomain.

In one embodiment, if a text unit mapping between a text unit and a trait and/or a subdomain has a weight that satisfies a pre-defined weight threshold, the training data extraction unit 510 identifies (or filters) a chat log containing the text unit as exhibiting/showing the trait and/or the subdomain. For example, in one embodiment, the training data extraction unit 510 identifies (or filters) the chat log as exhibiting/showing the trait and/or the subdomain by annotating/flagging/marking up the chat log and/or the text unit.

For example, in one embodiment, chatlogs exhibiting/showing traits associated with the domain of equity based stock markets are identified by detecting equity related text units in the chatlogs, and associating actions such as trading, long term investing, and balancing in the text units.

In one embodiment, the training system 330 comprises a specific trait model training unit 515 configured to train, in the training phase, a specialized chatbot 340 to model a single trait based on training data relevant to the trait. Specifically, for each trait, the specific trait model training unit 515 is configured to: (1) receive training data relevant to the trait (e.g., from the training data extraction unit 510), and (2) train a machine learning model to model the trait based on the training data, wherein the resulting trained machine learning model is a specialized chatbot 340 configured to generate a conversation including one or more responses that exhibit/show the trait.

In one embodiment, the specific trait model training unit 515 is configured to apply one or more machine learning techniques such as, but not limited to, density-based techniques (e.g., k-nearest neighbor, local outlier factor, etc.), subspace and correlation-based outlier detection for high-dimensional data techniques, support-vector machines, artificial neural networks.

In one embodiment, the training system 330 comprises a keyword/concept extractor unit 520 configured to associate, in the training phase, one or more keywords and/or concepts with a trait. Specifically, the keyword/concept extractor unit 520 is configured to: (1) receive the chat log database 501, and (2) for each trait, identify and record one or more keywords and/or concepts associated with the trait based on one or more chat logs of the chat log database 501 that are identified as exhibiting/showing the trait (e.g., identified by the training data extraction unit 510). For example, in one embodiment, a keyword/concept is identified and recorded as associated with the trait if the keyword/concept frequently occurs in the one or more chat logs identified as exhibiting/showing the trait (i.e., the keyword/concept is commonly/highly associated with the trait).

In one embodiment, the training system 330 comprises a keyword/concept model mapper unit 525 configured to label/tag, in the training phase, a specialized chatbot that models a trait with one or more keywords and/or concepts associated with the trait. Specifically, for each trait, the keyword/concept model mapper unit 525 is configured to: (1) receive a specialized chatbot that models the trait (e.g., from the specific trait model training unit 515), (2) receive one or more keywords and/or concepts associated with the trait (e.g., from the keyword/concept extractor unit 520), (3) label/tag the specialized chatbot with the one or more keywords and/or concepts associated with the trait, and (4) generate a mapping ("keyword/concept mapping") between each keyword/concept associated with the trait.

In one embodiment, for each trait, the training system 330 maintains at least one of the following: (a) at least one text unit mapping (e.g., generated by the training data extraction unit 510) between at least one text unit and the trait, and (b) at least one keyword/concept mapping (e.g., generated by the keyword/concept model mapper unit 525) between at least one keyword/concept and the trait. A keyword/concept mapping associates a particular keyword/concept with a particular trait that in turn is associated with a particular chat log based on a text unit mapping between a text unit of the particular chat log and the particular trait.

In one embodiment, the training system 330 comprises a multiple traits model training unit 530 configured to train, in the training phase, a specialized chatbot to jointly model multiple traits based on training data relevant to the multiple traits. Specifically, the multiple traits model training unit 530 is configured to: (1) receive multiple traits, wherein the multiple traits are a subset of the set of traits included in the trait policy database 502, (2) receive training data relevant to the multiple traits, wherein the training data is a union of all chat logs of the chat log database 501 that are identified as exhibiting/showing at least one of the multiple traits (e.g., identified by the training data extraction unit 510), and (3) train a machine learning model to jointly model the multiple traits based on the training data, wherein the resulting trained machine learning model is a specialized chatbot 340 configured to generate a conversation including one or more responses that jointly exhibit/show the multiple traits. In one embodiment, the multiple traits are explicitly selected/provided (e.g., via user input). In one embodiment, the specialized chatbot 340 is labeled/tagged with each keyword/concept associated with each of the multiple traits.

For example, in one embodiment, a specialized chatbot 340 trained to model traits of an aggressive stock trader is labeled/tagged with labels/tags such as "equity based stock markets", "short term investing", "aggressive", etc. As another example, in one embodiment, a specialized chatbot 340 trained to model traits of a defensive stock trader is labeled/tagged with labels/tags such as "equity based stock markets", "long term investing", "defensive", etc. As yet another example, in one embodiment, a specialized chatbot 340 trained to model traits of a balanced/mixed-mode stock trader is labeled/tagged with labels/tags such as "equity based stock markets", "mixed-mode", "balanced", etc.

In one embodiment, the multiple traits model training unit 530 is configured to apply one or more machine learning techniques such as, but not limited to, density-based techniques (e.g., k-nearest neighbor, local outlier factor, etc.), subspace and correlation-based outlier detection for high-dimensional data techniques, support-vector machines, artificial neural networks.

In one embodiment, the deployment system 330 comprises a multi-agent chatroom interface 540 configured to provide, in the deployment phase, a chatroom interface for a multi-agent chatroom 440, wherein the chatroom interface allows multiple participants to interact with one another in the chatroom 440.

In one embodiment, the deployment system 330 comprises a main chatbot 450 configured to control, in the deployment phase, invocation of a specialized chatbot 340 in the chatroom 440. Specifically, in the deployment phase, the main chatbot 450 is configured to: (1) in response to a user joining the chatroom 440, interact with the user by initiating a chat session with the user via the multi-agent chatroom interface 540, (2) monitor the chat session to determine an intent of the user, and (3) based on the intent of the user, selectively invoke on demand a specialized chatbot 340 (from the plurality of available specialized chatbots 340) in the chatroom 440 to interact with the user via the multi-agent chatroom interface 540. For example, in one embodiment, the main chatbot 450 invokes a specialized chatbot 340 to join the chatroom 440 to interact with a user in the chatroom 440 in response to the user indicating an intent to interact with an agent with a trait that the specialized chatbot 340 models. The main chatbot 450 is configured to invoke on demand different specialized chatbots 340 with different traits in the chatroom 440 to interact with the user via the multi-agent chatroom interface 540.

In one embodiment, the deployment system 330 comprises a chat session trait extractor 550 configured to identify, in the deployment phase, one or more traits that an agent interacting with a user in the chatroom 440 must have. Specifically, the chat session trait extractor 550 is configured to: (1) receive, as input, the trait policy database 502 and/or keyword/concept mappings (e.g., from the keyword/concept model mapper 525), and (2) based on the input and a chat log of a current/ongoing chat session involving a user in the chatroom 440 (e.g., from the main chatbot 450), determine an intent of the user and extract one or more traits from the chat session. Each trait extracted from the chat session represents a trait requirement that a response (i.e., chatbot response) to the user must satisfy (e.g., traits that a chatbot interacting with the user must model). For example, if during the chat session the user provides a query (e.g., question) that includes one or more keywords and/or concepts that map to one or more traits that an aggressive stock trader has, the chat session trait extractor 550 determines an intent of the user is to seek investing advice from the perspective of an aggressive stock trader, and extracts from the chat session the one or more traits that an aggressive stock trader has. As another example, if during the chat session the user provides a query (e.g., question) that includes one or more keywords and/or concepts that map to one or more traits that a beginner/novice investor has, the chat session trait extractor 550 determines an intent of the user is to learn about investing step-by-step, and extracts from the chat session one or more traits that an agent interacting with the user must have (e.g., patient, a teacher of investing, etc.).

In one embodiment, each trait that the chat session trait extractor 550 extracts from a current/ongoing chat session has a corresponding weight that is based on when a text unit (of a chat log of the chat session) from which the trait is extracted occurs. For example, in one embodiment, if a first point of time is closer to a current point of time than a second point of time, a trait extracted from a text unit of the chat log that occurs at the first point of time is weighted higher than another trait extracted from another text unit of the chat log that occurs at the second point of time.

In one embodiment, the deployment system 330 comprises a specialized chatbot invocation unit 555. In the deployment phase, the main chatbot 450 is configured to trigger the specialized chatbot invocation unit 555 to invoke a specialized chatbot 340 (from the plurality of available specialized chatbots 340) in the chatroom 440 to interact with a user in the chatroom 440. Specifically, the specialized chatbot invocation unit 555 is configured to: (1) for each available specialized chatbot 340, receive a set of labels/tags comprising one or more keywords and/or concepts that the specialized chatbot 340 is labeled/tagged with (e.g., from the keyword/concept model mapper 525), (2) receive one or more traits extracted from a current/ongoing chat session involving a user in the chatroom 440 (e.g., from the chat session trait extractor 550), and (3) determine whether a specialized chatbot 340 that models the one or more traits extracted is available (i.e., included in the plurality of available specialized chatbots 340) based each set of labels/tags received.

If a specialized chatbot 340 that models the one or more traits extracted is available (i.e., the specialized chatbot 340 is labeled/tagged with one or more keywords and/or concepts associated with the one or more traits extracted), the specialized chatbot invocation unit 555 is configured to invoke the specialized chatbot 340 in the chatroom 440 to interact with the user via the multi-agent chatroom interface 540. During an interaction between the specialized chatbot 340 and the user, the specialized chatbot 340 outputs, via the multi-agent chatroom interface 540, one or more responses modeling the one or more traits extracted.

If a specialized chatbot 340 that models the one or more traits extracted is not available (i.e., the plurality of available specialized chatbots 340 does not include any specialized chatbots 340 labeled/tagged with one or more keywords and/or concepts associated with the one or more traits extracted), the specialized chatbot invocation unit 550 is configured to trigger identification of a specialized chatbot 340 from the plurality of available specialized chatbots 340 that models one or more traits similar to the one or more traits extracted ("alternative specialized chatbot").

In one embodiment, the deployment system 430 comprises an alternative specialized chatbot identification unit 560. In the deployment phase, the specialized chatbot invocation unit 555 is configured to trigger the alternative specialized chatbot identification unit 560 to identify an alternative specialized chatbot 340 from the plurality of available specialized chatbots 340. Specifically, the alternative specialized chatbot identification unit 560 is configured to: (1) receive one or more traits extracted from a current/ongoing chat session involving a user in the chatroom 440 (e.g., from the chat session trait extractor 550), (2) identify an alternative specialized chatbot 340 from the plurality of available specialized chatbots 340 based on the one or more traits extracted, and (3) trigger invocation of the alternative specialized chatbot 340 in the chatroom 440, if identified.

For example, in one embodiment, for each available specialized chatbot 340, the alternative specialized chatbot identification unit 560 is configured to compute a distance mapping (e.g., vector distance mapping, cosine similarity between embeddings) between one or more keywords and/or concepts associated with the one or more traits extracted and one or more keywords and/or concepts that the specialized chatbot 340 is labeled/tagged with. If the distance mapping satisfies a pre-determined similarity threshold, the alternative specialized chatbot identification unit 560 identifies the specialized chatbot 340 as an alternative specialized chatbot 340, and triggers invocation of the alternative specialized chatbot 340 in the chatroom 440 to interact with the user.

In one embodiment, the deployment system 430 comprises an alternative specialized chatbot invocation unit 565. In the deployment phase, the alternative specialized chatbot identification unit 560 is configured to trigger the alternative specialized chatbot invocation unit 565 to invoke an alternative specialized chatbot 340 in the chatroom 440 to interact with a user in the chatroom 440 via the multi-agent chatroom interface 540. During an interaction between the alternative specialized chatbot 340 and the user, the alternative specialized chatbot 340 outputs, via the multi-agent chatroom interface 540, one or more responses modeling the one or more traits extracted.

For example, in one embodiment, if a specialized chatbot 340 that models a first set of traits extracted from a current/ongoing chat session is not available (i.e., not included in the plurality of available specialized chatbots 340), the alternative specialized chatbot identification unit 560 identifies an alternative specialized chatbot 340 from the plurality of available specialized chatbots 340 that models a second set of traits similar to the first set of traits (e.g., satisfies a pre-determined similarity threshold), and invokes the alternative specialized chatbot 340 in the chatroom 440. For example, the first set of traits may comprise one or more traits that restaurant experts for Italian restaurants in New York have, and the second set of traits may comprise one or more traits that restaurant experts for French restaurants in New York have.

In one embodiment, the chat session trait extractor 550 continuously analyzes a current/ongoing chat session involving a user in the chatroom 440 to determine a new intent (i.e., a change in intent) of the user and extract one or more new traits from the chat session (e.g., extracted from one or more text units (of a chat log of the chat session) that occur when the new intent is detected), thereby enabling the main chatbot 450 to invoke on demand a new specialized chatbot 340 that models the one or more new traits (i.e., a specialized chatbot 340 that has not yet been invoked during the chat session). To the user, the new specialized chatbot 340 represents a SME/domain expert with a different perspective (i.e., the one or more new traits) that joins the chatroom 440 to assist the user. These features contribute to the advantage of selectively invoking, based on the change in the intent of the user, a different specialized chatbot 340 from the plurality of available chatbots 340 in the chatroom 440 to interact with the user, thereby allowing the user to interact with a different agent with one or more traits that the invoked different specialized chatbot 340 models.

For example, assume a current/ongoing chat session involves a user in the chatroom 440 interacting with a specialized chatbot 340 that models traits that an aggressive stock trader has ("chatbot A"). The number of participants in the chatroom 440 is 3—the user, the main chatbot 450, and chatbot A. If the chat session trait extractor 550 detects, during the chat session, that an intent of the user has changed/shifted from seeking investing advice from the perspective of an aggressive stock trader to seeking investing advice from the perspective of a defensive stock trader instead, the main chatbot 450 invokes a new specialized chatbot 340 that models traits that a defensive stock trader has ("chatbot B") to join the chatroom 440 and interact with the user. The number of participants in the chatroom 440 is now 4—the user, the main chatbot 450, chatbot A, and chatbot B. After a pre-determined amount of time, if the user continues to express an intent to seek investing advice from the perspective of a defensive stock trader, the main chatbot 450 may place chatbot A in sleep mode or even remove chatbot A from the chatroom 440 (which reduces the number of participants in the chatroom 440 to 3—the user, the main chatbot 450, and chatbot B). If the chat session trait extractor 550 detects, during the chat session, that an intent of the user has changed/shifted again from seeking investing advice from the perspective of a defensive stock trader to seeking investing advice from the perspective of a balanced/mixed-mode stock trader instead, the main chatbot 450 invokes a new specialized chatbot 340 that models traits that a balanced/mixed-mode stock trader has ("chatbot C") to join the chatroom 440 and interact with the user.

As another example, assume a current/ongoing chat session involves a player of a sport who formulates a strategy. Multiple, different specialized chatbots 340 are available that can advise the player from multiple perspectives. For example, if the sport is tennis and the player inquires whether attacking an opponent in a match by making a shot from his/her forehand to his/her high backhand is a good strategy, a first specialized chatbot 340 can provide a response that accounts for the physical fitness of the player (e.g., a medical perspective), a second specialized chatbot 340 can provide a different response that accounts for strengths and weaknesses of both the player and the opponent (e.g., a coaching perspective), and a third specialized chatbot 340 can provide another different response to the inquiry that accounts for training and warm-up the player will go through prior to the match to prepare for making the shot on a consistent basis (e.g., a physical conditioning perspective).

As another example, assume a current/ongoing chat session involves a patient who can receive advice from multiple, different specialized chatbots 340 representing different medical professionals/specialists based on the patient's medical reports. For example, the available chatbots 340 can include a cardiologist chatbot, a neurology chatbot, a chest-and-lung chatbot, a General Practitioner chatbot, etc.

Figure 6:
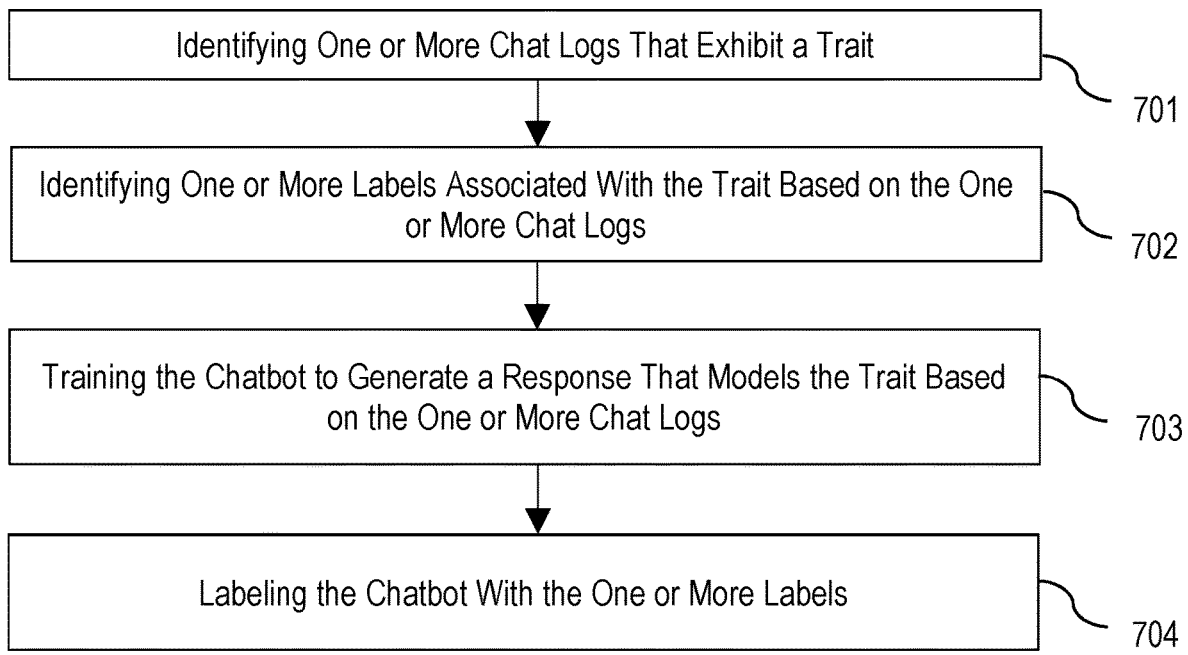
FIG. 6 is a flowchart of an example process for training a chatbot, in accordance with an embodiment of the invention.

FIG. 6 is a flowchart of an example process 700 for training a chatbot, in accordance with an embodiment of the invention. Process block 701 includes identifying one or more chat logs that exhibit a trait. Process block 702 includes identifying one or more labels associated with the trait based on the one or more chat logs. Process block 703 includes training the chatbot to generate a response that models the trait based on the one or more chat logs. Process block 704 includes labeling the chatbot with the one or more labels.

In one embodiment, process blocks 701-704 are performed by one or more components of the training system 330.

Figure 7:
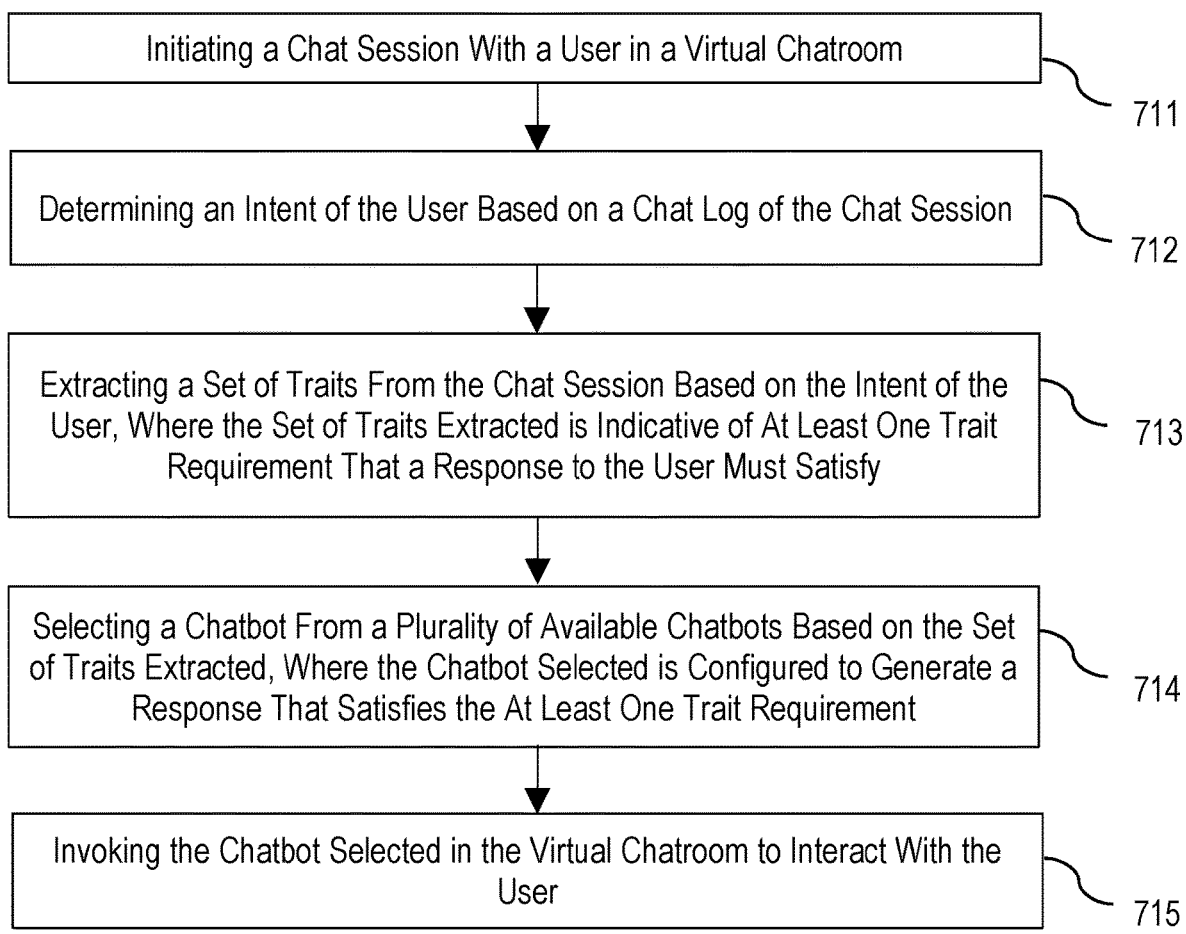
FIG. 7 is a flowchart of an example process for controlling invocation of at least one of a plurality of available chatbots in a virtual chatroom.

FIG. 7 is a flowchart of an example process 710 for controlling invocation of at least one of a plurality of available chatbots in a virtual chatroom. Process block 711 includes initiating a chat session with a user in the virtual chatroom. Process block 712 includes determining an intent of the user based on a chat log of the chat session. Process block 713 includes extracting a set of traits from the chat session based on the intent of the user, where the set of traits extracted is indicative of at least one trait requirement that a response to the user must satisfy (e.g., the response must model either the set of traits extracted or a set of different traits similar to the set of traits extracted based on distance mapping and a pre-determined similarity threshold). Process block 714 includes selecting a chatbot from the plurality of available chatbots based on the set of traits extracted, where the chatbot selected is configured to generate a response that satisfies the at least one trait requirement (e.g., the chatbot selected models either the set of traits extracted or a set of different traits similar to the set of traits extracted based on distance mapping and a pre-determined similarity threshold). Process block 715 includes invoking the chatbot selected in the virtual chatroom to interact with the user.

In one embodiment, process blocks 711-715 are performed by one or more components of the deployment system 430.

Figure 8:
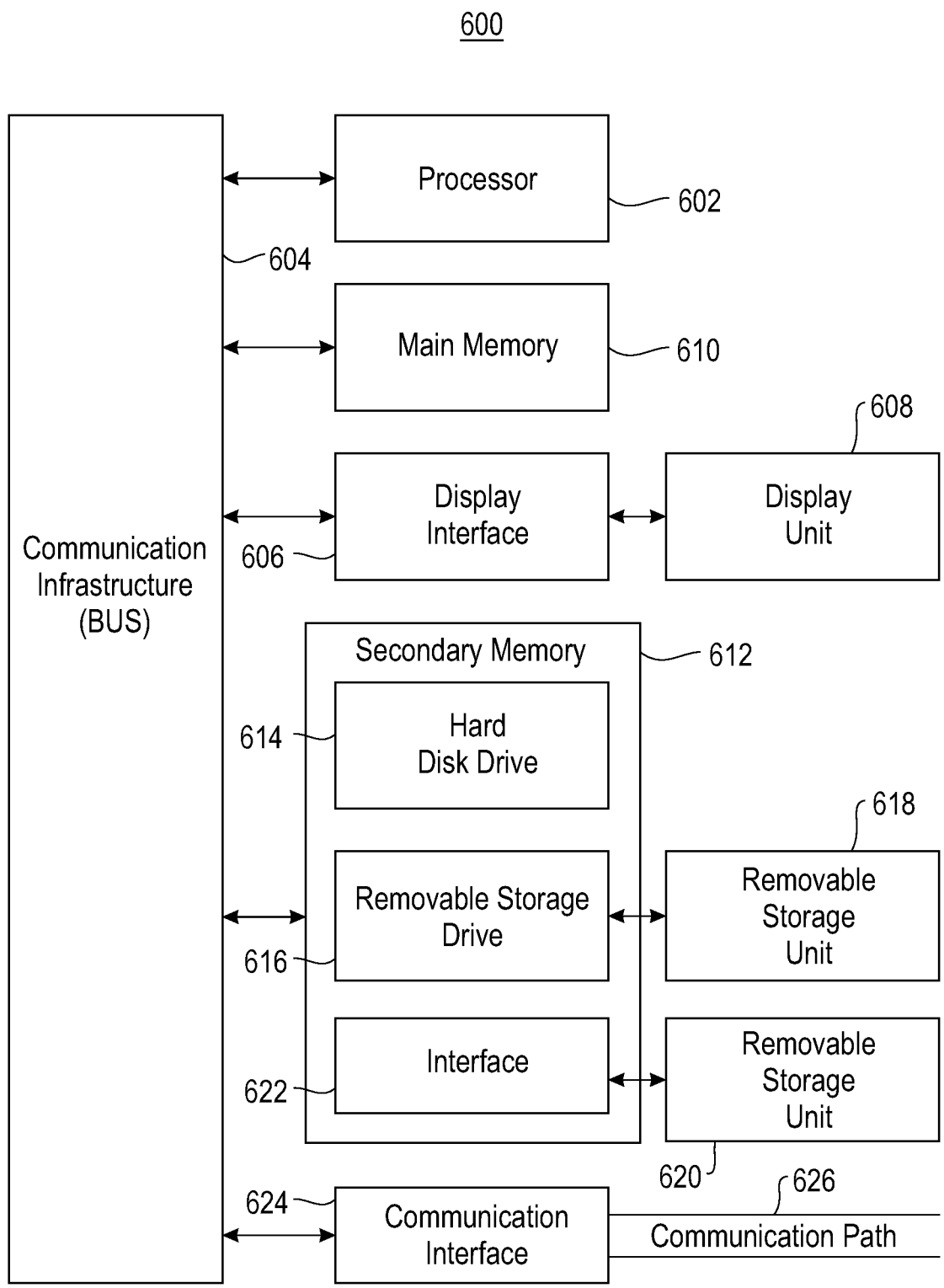
FIG. 8 is a high level block diagram showing an information processing system useful for implementing an embodiment of the invention.

FIG. 8 is a high level block diagram showing an information processing system 600 useful for implementing one embodiment of the invention. The computer system includes one or more processors, such as processor 602. The processor 602 is connected to a communication infrastructure 604 (e.g., a communications bus, cross-over bar, or network).

The computer system can include a display interface 606 that forwards graphics, text, and other data from the voice communication infrastructure 604 (or from a frame buffer not shown) for display on a display unit 608. In one embodiment, the computer system also includes a main memory 610, preferably random access memory (RAM), and also includes a secondary memory 612. In one embodiment, the secondary memory 612 includes, for example, a hard disk drive 614 and/or a removable storage drive 616, representing, for example, a floppy disk drive, a magnetic tape drive, or an optical disk drive. The removable storage drive 616 reads from and/or writes to a removable storage unit 618 in a manner well known to those having ordinary skill in the art. Removable storage unit 618 represents, for example, a floppy disk, a compact disc, a magnetic tape, or an optical disk, etc. which is read by and written to by removable storage drive 616. As will be appreciated, the removable storage unit 618 includes a computer readable medium having stored therein computer software and/or data.

In alternative embodiments, the secondary memory 612 includes other similar means for allowing computer programs or other instructions to be loaded into the computer system. Such means include, for example, a removable storage unit 620 and an interface 622. Examples of such means include a program package and package interface (such as that found in video game devices), a removable memory chip (such as an EPROM, or PROM) and associated socket, and other removable storage units 620 and interfaces 622, which allows software and data to be transferred from the removable storage unit 620 to the computer system.

In one embodiment, the computer system also includes a communication interface 624. Communication interface 624 allows software and data to be transferred between the computer system and external devices. In one embodiment, examples of communication interface 624 include a modem, a network interface (such as an Ethernet card), a communication port, or a PCMCIA slot and card, etc. In one embodiment, software and data transferred via communication interface 624 are in the form of signals which are, for example, electronic, electromagnetic, optical, or other signals capable of being received by communication interface 624. These signals are provided to communication interface 624 via a communication path (i.e., channel) 626. In one embodiment, this communication path 626 carries signals and is implemented using wire or cable, fiber optics, a phone line, a cellular phone link, an RF link, and/or other communication channels.

Embodiments of the invention may be a system, a method, and/or a computer program product at any possible technical detail level of integration. The computer program product may include a computer readable storage medium (or media) having computer readable program instructions thereon for causing a processor to carry out aspects of embodiments of the invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the invention.

Aspects of embodiments of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the above description, it can be seen that embodiments of the invention provide a system, computer program product, and method for implementing the embodiments of the invention. Embodiments of the invention further provide a non-transitory computer-useable storage medium for implementing the embodiments of the invention. The non-transitory computer-useable storage medium has a computer-readable program, wherein the program upon being processed on a computer causes the computer to implement the steps of embodiments of the invention described herein. References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments of the invention only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of training a chatbot, comprising:
   identifying one or more chat logs that exhibit a first trait;
   identifying one or more labels associated with the first trait based on the one or more chat logs, wherein each label is a keyword that frequently occurs in the one or more chat logs;
   training the chatbot to generate a response that models the first trait based on the one or more chat logs;
   labeling the chatbot with the one or more labels;
   determining an intent of a user in a virtual chatroom by extracting a second trait from a chat log of an ongoing chat session in the virtual chatroom;
   determining whether the first trait and the second trait are identical or similar;
   invoking the chatbot in the virtual chatroom in response to determining the first trait and the second trait are identical or similar, wherein the chatbot provides the user with one or more responses, in a topic, that model the first trait;
   detecting a change in the intent of the user by extracting a third trait from the chat log that is neither identical to nor similar to the second trait; and
   invoking a different chatbot in the virtual chatroom, wherein the different chatbot is trained to generate a response that models the third trait, and the different chatbot provides the user with one or more additional responses, in the same topic, that model the third trait.

2. The method of claim 1, wherein the chatbot and the different chatbot represent different subject matter experts in the same topic with different perspectives.

3. The method of claim 1, wherein identifying one or more chat logs that exhibit a first trait comprises:
   receiving a database of chat logs including the one or more chat logs;
   for each text unit of each chat log of the database, determining a degree of similarity between the text unit and the first trait, and generating a mapping between the text unit and the first trait, wherein the mapping has a weight that is based on the degree of similarity; and
   identifying the one or more chat logs based on one or more mappings between one or more text units of the one or more chat logs and the first trait, wherein each of the one or more mappings has a weight that satisfies a pre-determined weight threshold.

4. The method of claim 3, further comprising:
   receiving a set of traits including the first trait;
   identifying a set of chat logs of the database that exhibit at least one trait of the set of traits;
   identifying a set of labels associated with at least one trait of the set of traits based on the set of chat logs;
   training the chatbot to generate a response that jointly models the set of traits based on the set of chat logs; and
   labeling the chatbot with the set of labels.

5. The method of claim 4, wherein each label comprises a keyword or a concept associated with a trait of the set of traits.

6. The method of claim 4, wherein each trait of the set of traits comprises a personality trait or an expertise trait that a domain expert has.

7. A system for training a chatbot, comprising:
   at least one processor; and
   a non-transitory processor-readable memory device storing instructions that when executed by the at least one processor causes the at least one processor to perform operations including:
      identifying one or more chat logs that exhibit a first trait;
      identifying one or more labels associated with the first trait based on the one or more chat logs, wherein each label is a keyword that frequently occurs in the one or more chat logs;
      training the chatbot to generate a response that models the first trait based on the one or more chat logs;
      labeling the chatbot with the one or more labels;
      determining an intent of a user in a virtual chatroom by extracting a second trait from a chat log of an ongoing chat session in the virtual chatroom;
      determining whether the first trait and the second trait are identical or similar;
      invoking the chatbot in the virtual chatroom in response to determining the first trait and the second trait are identical or similar, wherein the chatbot provides the user with one or more responses, in a topic, that model the first trait;
      detecting a change in the intent of the user by extracting a third trait from the chat log that is neither identical to nor similar to the second trait; and
      invoking a different chatbot in the virtual chatroom, wherein the different chatbot is trained to generate a response that models the third trait, and the different chatbot provides the user with one or more additional responses, in the same topic, that model the third trait.

8. The system of claim 7, wherein the chatbot and the different chatbot represent different subject matter experts in the same topic with different perspectives.

9. The system of claim 7, wherein identifying one or more chat logs that exhibit a first trait comprises:
   receiving a database of chat logs including the one or more chat logs;
   for each text unit of each chat log of the database, determining a degree of similarity between the text unit and the first trait, and generating a mapping between the text unit and the first trait, wherein the mapping has a weight that is based on the degree of similarity; and
   identifying the one or more chat logs based on one or more mappings between one or more text units of the one or more chat logs and the first trait, wherein each of the one or more mappings has a weight that satisfies a pre-determined weight threshold.

10. The system of claim 9, wherein the operations further include:
    receiving a set of traits including the first trait;
    identifying a set of chat logs of the database that exhibit at least one trait of the set of traits;

identifying a set of labels associated with at least one trait of the set of traits based on the set of chat logs;

training the chatbot to generate a response that jointly models the set of traits based on the set of chat logs; and labeling the chatbot with the set of labels.

11. A method of controlling invocation of at least one of a plurality of available chatbots in a virtual chatroom, comprising:

initiating a chat session with a user in the virtual chatroom;

determining an intent of the user based on a chat log of the chat session;

extracting a first set of traits from the chat log based on the intent of the user, wherein the first set of traits extracted is indicative of at least one trait requirement that a response to the user must satisfy, the first set of traits extracted are associated with one or more labels, and each label is a keyword that frequently occurs in the chat log;

selecting a chatbot from the plurality of available chatbots based on the first set of traits extracted, wherein the chatbot selected is configured to generate a response that satisfies the at least one trait requirement, the chatbot selected was trained based on one or more chat logs, the chatbot selected is labeled with one or more other labels associated with a second set of traits extracted from the one or more chat logs, and the first set of traits extracted and the second set of traits extracted are identical or similar;

invoking the chatbot selected in the virtual chatroom to interact with the user, wherein the chatbot selected provides the user with one or more responses, in a topic, that satisfy the at least one trait requirement;

detecting a change in the intent of the user by extracting a third set of traits from the chat log that are neither identical to nor similar to the first set of traits, wherein the third set of traits extracted is indicative of at least one different trait requirement that a response to the user must satisfy; and invoking a different chatbot from the plurality of available chatbots in the virtual chatroom, wherein the different chatbot is configured to generate a response that satisfies the at least one different trait requirement, and the different chatbot provides the user with one or more additional responses, in the same topic, that satisfy the at least one trait requirement.

12. The method of claim 11, wherein extracting a first set of traits from the chat session based on the intent of the user comprises:

receiving one or more mappings, wherein each mapping is between a label and a trait; and identifying one or more text units of the chat log that map to the set of traits extracted based on the one or more mappings.

13. The method of claim 11, wherein selecting a chatbot from the plurality of available chatbots based on the first set of traits extracted comprises:

determining whether the plurality of available chatbots includes a first chatbot configured to generate a response that models the first set of traits extracted.

14. The method of claim 13, wherein the first chatbot is labeled with one or more labels that are associated with the first set of traits extracted.

15. The system of claim 14, wherein each label of the one or more labels comprises a keyword or a concept associated with a trait of the first set of traits extracted.

16. The method of claim 13, wherein the chatbot selected is the first chatbot in response to determining the plurality of available chatbots includes the first chatbot.

17. The method of claim 13, wherein selecting a chatbot from the plurality of available chatbots based on the first set of traits extracted further comprises:

in response to determining the plurality of available chatbots does not include the first chatbot:

identifying a second chatbot included in the plurality of available chatbots based on distance mapping and a pre-determined similarity threshold, wherein the second chatbot is configured to generate a response that models a set of different traits similar to the first set of traits extracted, and the chatbot selected is the second chatbot.

18. The method of claim 11, wherein the chatbot selected and the different chatbot represent different subject matter experts in the same topic with different perspectives.

19. The method of claim 11, wherein each trait of the first set of traits extracted comprises a personality trait or an expertise trait that a domain expert has.

20. The method of claim 11, wherein the first set of traits extracted comprises one of a single trait or multiple traits.

* * * * *